Patented Mar. 3, 1931

1,794,553

UNITED STATES PATENT OFFICE

EUGENE P. SCHOCH, OF AUSTIN, TEXAS

PROCESS OF RECOVERING SALTS FROM MINERALS

No Drawing.  Application filed November 7, 1929. Serial No. 405,542.

My invention relates to the extraction of salts from minerals and more particularly has reference to a process of obtaining calcium sulphate, potassium sulphate, and magnesium sulphate in substantially pure form from minerals containing the same.

In my prior application Serial No. 300,959, filed August 20, 1928, I have described and claimed a process of obtaining gypsum and potassium and magnesium sulphates from polyhalite, krugite, and other ores containing the same, which process consists essentially in first heating the ore to a temperature sufficient to dehydrate the same and then leaching with hot water to dissolve the soluble potassium and magnesium sulphates and to leave a residue of substantially pure gypsum.

In my prior application Serial No. 329,316, filed December 29, 1928, I have described and claimed certain improvements on the process above referred to whereby there may be obtained gypsum ($CaSO_4 \cdot 2H_2O$), postassium sulphate, and magnesium sulphate each in substantially pure form from polyhalite, krugite, and similar ores.

My present invention is directed to improvements in the process of my applications above referred to, whereby the calcium sulphate, instead of being obtained in hydrated form (gypsum), is obtained in substantially unhydrated form or only slightly hydrated, in which condition the calcium sulphate is more valuable than when obtained in the form of gypsum.

In the process of my application Serial No. 329,316, a solution containing potassium and magnesium sulphates is evaporated by aeration with the resultant separation of crystals of schoenite ($MgSO_4 \cdot K_2SO_4 \cdot 6H_2O$) which are added to the solution in a preceding stage of the process to assist in crystallization of potassium sulphate. At certain times of the year evaporation by aeration is impractical and according to another feature of my present invention, aeration is dispensed with and the solution evaporated by heating in vacuum evaporators. As a result of such procedure, the entire operation becomes more generally operable than heretofore. The heat-evaporation deposits crystals of leonite ($MgSO_4 \cdot K_2SO_4 \cdot 4H_2O$) rather than the schoenite crystals formed by the aeration process of my prior application, but since these two salts have identical compositions except for the amount of water of hydration, the leonite crystals may be returned to the process to assist crystallization of potassium sulphate with the same effects that are produced by the return of schoenite according to application Serial No. 329,316. Hence the use of heat-evaporation in place of aeration does not affect the rest of the process.

Referring to the production of unhydrated or only slightly hydrated calcium sulphate in accordance with my invention, I have discovered that if, in the extraction of the roasted mineral with hot water as described in my application above referred to, care is taken to maintain the water substantially at the boiling point and the mixture prevented from dropping appreciably below 100° C. before the solid residue has been separated, then the residual calcium sulphate will remain in the unhydrated form and can be removed as such. On the other hand, if the residue, while in contact with the water, is allowed to cool appreciably below 100° C., say to 70° C., the calcium sulphate will become hydrated to whatever extent is permitted by the quantity of water in contact therewith and with sufficient water, it will be hydrated to gypsum ($CaSO_4 \cdot 2H_2O$). By reason of the fact that in my prior process the mixture was allowed to cool, gypsum or hydrated calcium sulphate was obtained rather than unhydrated calcium sulphate. As pointed out, by the present process unhydrated, or only slightly hydrated, calcium sulphate is produced and this product may be used directly, without further heating, in the making of plaster or other materials requiring unhydrated calcium sulphate.

Referring now to the heat-evaporation in the vacuum evaporators, like the aeration step of application Serial No. 329,316, this operation will begin with the hot liquor from which potassium sulphate has been produced by addition of a crystal crop of magnesium sulphate and potassium sulphate (in this case preferably leonite), the liquor being preferably made by the addition to contain the magnesium sulphate and potassium sulphate in the molecular ratio of 1.5 to 1. In order to produce leonite crystals from a solution of this particular composition, the latter must be evaporated at temperatures below 89° C., while solutions containing greater proportions of magnesium sulphate must be evaporated at still lower temperatures. Thus a solution containing $MgSO_4$ to $K_2SO_4$ in the molecular ratio of 7.5 to 1 will yield leonite only at a temperature of 61° C. or slightly less, and solutions of intermediate compositions must be evaporated at or below corresponding intermediate temperatures. In a specific example, I carried out this evaporation in four steps as follows:

1. Evaporating the solution at 81° C. until the molecular ratio of $MgSO_4$ to $K_2SO_4$ in the solution changed from 1.5 to 2.75;
2. Evaporating at 74° C. until the molecular ratio became 4 to 1;
3. Evaporating at 67° C. until the molecular ratio became 5.25 to 1;
4. Evaporating at 60° C. until the molecular ratio became 6.5 to 1.

In each of the above steps, the evaporation might have been continued until the molecular ratios had been somewhat greater. Thus in the last step, the evaporation might have been continued until the molecular ratio of the $MgSO_4$ to the $K_2SO_4$ in solution was as high as 7.5 to 1; but it was done as above stated in order to avoid an admixture of magnesium sulphate crystals. The boiling points for these evaporations are maintained by applying suitable pressures; thus for 60° C., a pressure of 120 mm. of mercury had to be maintained. The range of pressures thus required is well within the range now in use with commercial evaporators.

The process of my present invention is applicable to the treatment generally of minerals or ores containing calcium sulphate, potassium sulphate, and magnesium sulphate. Polyhalite ($2CaSO_4.K_2SO_4.MgSO_4.2H_2O$), found in west Texas and New Mexico in fairly pure form, is a common type of ore containing the above mentioned compounds, and I shall therefore more particularly describe my process with reference to the treatment of that mineral. However, it is to be expressly understood that my invention is not limited to the treatment of polyhalite as the process may be applied to other ores containing calcium sulphate, potassium sulphate, and magnesium sulphate, for example, krugite ($4CaSO_4.MgSo_4.K_2SO_4.2H_2O$) and others.

Referring now to the treatment of polyhalite in accordance with my invention, the ore having been crushed, admixtures of common salt contained therein are first removed say by leaching with cold water. The ore will now be found to contain practically only the normal ingredients of polyhalite in the molecular proportions as expressed by the formula, $2CaSO_4.MgSO_4.K_2SO_4.2H_2O$, with the possible exception of a slight excess of calcium sulphate over the amount called for by the formula.

The ore is now calcined or roasted to expel the water of crystallization as in my prior application Serial No. 300,959 above referred to and the resulting mass, while still hot, is dropped into water in a leacher, the water being preferably prewarmed sufficiently to be brought to the boiling point by the heat of the calcined ore. As explained in my prior application Serial No. 300,959, the removal of water of crystallization from the ore enables the potassium and magnesium sulphates to be practically entirely removed in a short time by leaching with hot water while at the same time a concentrated solution of these salts is obtained. The amount of water into which the heated ore is introduced may be such as to immediately form a saturated solution with the potassium and magnesium sulphates extracted, but a larger volume of water is preferably employed so that the solution will be definitely below saturation since further quantities of potassium and magnesium sulphates are added to the extract at subsequent stages in the process as will be hereinafter described.

The above mixture of ore and water is carefully maintained at or near the boiling point, and the solid part is then separated from the liquid by any suitable method, as by filtration with suction or centrifuging, which will allow of maintaining particularly the solid portion at or slightly above the boiling point of water until the liquor has been so completely separated from the solid as to leave as little water as possible and in no case to exceed ½ molecule of water for every molecule of calcium sulphate. Under these conditions, the calcium sulphate will be obtained in an essentially unhydrated or only slightly hydrated condition, whereas if it is allowed to cool appreciably while it is in contact with the liquid, the calcium sulphate will hydrate itself completely to gypsum, $CaSO_4.2H_2O$. This unhydrated calcium sulphate is removed as the first final product of the process.

To the liquor separated from the calcium sulphate and still at substantially the boiling point there is now added a quantity of crystals of potassium and magnesium sulphates obtained in a subsequent stage in the process to be described and the mixture stirred. The potassium and magnesium sulphates added may be in the form of schoenite or leonite but the latter is preferred since it is formed in a subsequent stage of the operation. The quanity of leonite is preferably such as will suffice to produce a liquor containing magnesium sulphate and potassium sulphate approximately in the molecular ratio of 1.5 to 1 and to produce at the same time the maximum possible yield of potassium sulphate crystals. While the potassium and magnesium sulphate crystals dissolve in the liquor, there separates from the mixture a crystal crop of substantially pure potassium sulphate which is removed from the solution and collected as the second final product of the process.

As in my application Serial No. 329,316, to the resulting liquor, that is, the liquor from which the potassium sulphate has been crystallized and removed, there is now added a second quantity of potassium and magnesium sulphates, preferably langbeinite ($2MgSO_4 \cdot K_2SO_4$) also obtained in a subsequent stage of the process to be described. However, instead of cooling and evaporating this mixture by aeration as in the process of my application Serial No. 329,316, according to the present invention I proceed to crystallize leonite out of the mixture (instead of schoenite as in the prior process) by evaporating the solution under such partial vacuum that the solution may boil at or below the following temperatures:

At or below 89° C. when the ratio of the molecules of magnesium sulphate to potassium sulphate in solution is 1.5 to 1;

At or below 61° C. when the ratio of the molecules of magnesium sulphate to potassium sulphate in solution is 7.5 to 1;

One or more degrees lower than 89° C. for every 6/28 increase in the ratio of the molecules of magnesium sulphate to potassium sulphate in solution.

During this operation of vacuum evaporation, there occurs a crystallization of leonite which comprises the first crop of mixed crystals of potassium and magnesium sulphates added to the liquor above mentioned which is about to undergo crystallization for potassium sulphate as already described. In other words, the mixed crystals of potassium and magnesium sulphates or leonite separated during the heat-evaporation constitute the first of the two sulphate additions above described, the first addition being the one just prior to potassium sulphate separation.

The liquor is now drained from the leonite crystals, heated to above 89° C. and evaporated at a temperature above 89° C. During this evaporation there occurs a crystallization of langbeinite as a second mixture crystal crop of potassium and magnesium sulphates obtained in the process, this crop constituting the quantity of potassium and magnesium sulphates added to the liquor after the step of removing the pure potassium sulphate crystals and prior to the vacuum evaporation as above described. In other words, the mixed potassium and magnesium sulphate crystals or langbeinite separated at this point in the process are returned to the liquor as the above second mentioned addition of potassium and magnesium sulphates. It will be noted that this second crop of mixed sulphate crystals or langbeinite contains a higher ratio of magnesium sulphate than potassium sulphate, than the leonite or first crop of mixed sulphate crystals.

The liquor is now drained from the langbeinite crystals and cooled to ordinary temperatures, say 25° C., as rapidly as possible with vigorous stirring so as to obtain the smallest crystals possible. The crystal crop thus obtained is essentially composed of Epsom salts, $MgSO_4 \cdot 7H_2O$, the third final product of the process, which is then separated as completely as possible from the remaining liquor, as for example by means of centrifuges or suction filters. In this way the amount of potassium sulphate enclosed with the Epsom salt may be less than 2%, even as low as 1.7%, while the molecular ratio of $MgSO_4$ to $K_2SO_4$ in the liquor may have changed from 15 to 1 to about 8 to 1. This liquor may be evaporated further at temperatures above 89° C. to obtain a further crop of langbeinite, and from the remaining liquor a further crop of Epsom salt, and so on until the liquor is completely evaporated.

From the foregoing it will be seen that I have devised a practical and economical method of obtaining unhydrated calcium sulphate, potassium sulphate, and magnesium sulphate in substantially pure form from minerals or ores containing these salts. Although I have described the process with considerable particularity, the invention is to be construed as limited only by the scope of the appended claims.

Having described my invention, I claim:

1. The process of recovering calcium sulphate, potassium sulphate, and magnesium sulphate from ores containing the same which comprises washing the ore with cold water to remove common salt; heating the ore sufficiently to expel water of crystallization; leaching the ore with water at substantially boiling temperature to dissolve the potassium and magnesium sulphates; removing the undissolved calcium sulphate from the resultant liquor while maintaining same at substantially the boiling point of water; mixing with the liquor a quantity of potassium and magnesium sulphates obtained in a later stage of the process; permitting crystallization of potassium sulphate from the resultant mixture and removing the same from the system; mixing with the resultant liquor a second quantity of potassium and magnesium sulphates obtained in a later stage of the process; heating the resultant mixture to evaporate water and to cause crystallization of mixed crystals of potassium and magnesium sulphates; separating the resultant mixture of potassium and magnesium sulphates and utilizing the same as the first mentioned quantity of potassium and magnesium sulphates added to the liquor as above stated; evaporating the resultant liquor to cause crystallization of a second mixture of potassium and magnesium sulphates; separating said second mixture and utilizing the same as the second mentioned quantity of potassium and magnesium sulphates added to the liquor as above stated; and evaporating the remaining liquor to thereby cause crystallization of magnesium sulphate and removing the same from the system.

2. In a process or recovering calcium sulphate potassium sulphate, and magnesium sulphate from ores containing the same, the steps which comprise leaching the ore with water at substantially boiling temperature to dissolve the potassium and magnesium sulphates; removing the undissolved calcium sulphate from the resultant liquor while maintaining same at substantially the boiling point of water; mixing with the liquor a quantity of potassium and magnesium sulphates obtained in a later stage of the process; permitting crystallization of potassium sulphate from the resultant mixture and removing the same from the system; mixing with the resultant liquor a second quantity of potassium and magnesium sulphates obtained in a later stage of the process; heating the resultant mixture to evaporate water and to cause crystallization of mixed crystals of potassium and magnesium sulphates; separating the resultant mixture of potassium and magnesium sulphates and utilizing the same at the first mentioned quantity of potassium and magnesium sulphates added to the liquor as above stated; evaporating the resultant liquor to cause crystallization of a second mixture of potassium and magnesium sulphates; separating said second mixture and utilizing the same as the second mentioned quantity of potassium and magnesium sulphates added to the liquor as above stated; and evaporating the remaining liquor to thereby cause crystallization of magnesium sulphate and removing the same from the system.

3. The process of recovering calcium sulphate, potassium sulphate, and magnesium sulphate from ores containing the same which comprises heating the ore sufficiently to expel water of crystallization; leaching the ore with water at substantially boiling temperature to dissolve the potassium and magnesium sulphates; removing the undissolved calcium sulphate from the resultant liquor while maintaining same at substantially the boiling point of water; mixing with the liquor a quantity of potassium and magnesium sulphates; permitting crystallization of potassium sulphate from the resultant mixture and removing the same from the system; mixing with the resultant liquor a second quantity of potassium and magnesium sulphates; and recovering magnesium sulphate from the mixture.

4. The process of recovering calcium sulphate, potassium sulphate, and magnesium sulphate from ores containing the same which comprises heating the ore sufficiently to dehydrate the same; extracting the potassium and magnesium sulphates with boiling water; separating the undissolved calcium sulphate from the resultant solution while maintaining the solution at substantially the boiling point of water; crystallizing potassium sulphate out of the solution; separating the potassium sulphate crystals from the liquor; and treating the later for recovery of magnesium sulphate.

5. The process of recovering calcium sulphate, potassium sulphate, and magnesium sulphate from ores containing the same which comprises extracting the potassium and magnesium sulphates by treatment of the ore with boiling water; removing the undissolved calcium sulphate from the resultant liquor while maintaining same at substantially the boiling point of water; mixin with the liquor a crop of mixed crystals of potassium and magnesium sulphates containing a greater proportion of potassium sulphate than magnesium sulphate; permitting crystallization of potassium sulphate from the resultant mixture and removing the same from the system; mixing with the resultant liquor a second crop of mixed crystals of potassium and magnesium sulphates containing a greater proportion of magnesium sulphate than potassium sulphate; and recovering magnesium sulphate from the mixture.

6. In a process of recovering calcium sulphate, potassium sulphate, and magnesium sulphate from ores containing the same, the steps which comprise extracting the ore with water at substantially the boiling point; removing the undissolved calcium sulphate from the resultant liquor while maintaining the mass at substantially the boiling point of water; and treating the liquor for the crystallization of potassium sulphate and magnesium sulphate.

7. In a process of recovering calcium sulphate, potassium sulphate, and magnesium sulphate from ores containing the same, the steps which comprise extracting the potassium and magnesium sulphates by leaching the ore with hot water; remove the undissolved calcium sulphate from the resultant liquor; adding to the liquor a quantity of potassium and magnesium sulphates; permitting crystallization of potassium sulphate from the resultant mixture and removing the same from the system; adding to the resultant liquor a second quantity of potassium and magnesium sulphates; subjecting the resultant mixture to vacuum evaporation to cause crystallization of mixed crystals of potassium and magnesium sulphates; separating the crystals from the liquor; and treating the liquor for the recovery of magnesium sulphate.

EUGENE P. SCHOCH.